United States Patent
Bjarnason et al.

(10) Patent No.: US 12,341,810 B2
(45) Date of Patent: Jun. 24, 2025

(54) SYSTEM AND METHOD FOR OBSCURING STATUS OF A NETWORK SERVICE

(71) Applicant: Arbor Networks, Inc., Westford, MA (US)

(72) Inventors: Steinthor Bjarnason, Fjerdingby (NO); Sean O'Hara, Saline, MI (US)

(73) Assignee: ARBOR NETWORKS, INC., Westford, MA (US)

( * ) Notice: Subject to any disclaimer, the term of this patent is extended or adjusted under 35 U.S.C. 154(b) by 402 days.

(21) Appl. No.: 17/992,320

(22) Filed: Nov. 22, 2022

(65) Prior Publication Data
US 2024/0171606 A1 May 23, 2024

(51) Int. Cl.
*H04L 9/40* (2022.01)
*H04L 43/12* (2022.01)

(52) U.S. Cl.
CPC .......... *H04L 63/1458* (2013.01); *H04L 43/12* (2013.01); *H04L 63/1416* (2013.01)

(58) Field of Classification Search
CPC .. H04L 63/1458; H04L 43/12; H04L 63/1416
See application file for complete search history.

(56) References Cited

U.S. PATENT DOCUMENTS

| | | | |
|---|---|---|---|
| 2018/0115523 A1* | 4/2018 | Subbarayan | G06N 20/00 |
| 2018/0367566 A1* | 12/2018 | Ma | H04L 63/0236 |
| 2020/0153861 A1* | 5/2020 | Park | H04L 45/745 |
| 2021/0037054 A1* | 2/2021 | Shultz | H04L 63/20 |
| 2021/0112091 A1* | 4/2021 | Compton | H04L 63/1416 |

* cited by examiner

*Primary Examiner* — Ali S Abyaneh
(74) *Attorney, Agent, or Firm* — Foley & Lardner LLP (57) ABSTRACT

A computer implemented method system for obscuring the status of a network service provided by a network device. Received in a network monitoring device is network packet request message intended for a network device. The network monitoring device analyzes the received network packets request to determine whether the received network packet request is a DDoS network probe packet request. If the received packet request was determined to be a DDoS network probe packet requests, a response is generated and sent from the network monitoring device to the device that sent the DDoS network probe packet request indicating a faux degradation of service level for the intended network device.

17 Claims, 3 Drawing Sheets

SYSTEM AND METHOD FOR OBSCURING STATUS OF A NETWORK SERVICE

Background

1. FIELD

The disclosed embodiments relate to the field of communications technologies, and in particular, to a method and system, and an apparatus for obscuring the status of a network service provided by a network device.

2. Description of Related Art

The Internet is a global public network of interconnected computer networks that utilize a standard set of communication and configuration protocols. It consists of many private, public, business, school, and government networks. Within each of the different networks are numerous host devices such as workstations, servers, cellular phones, portable computer devices, to name a few examples. These host devices are able to connect to devices within their own network or to other devices within different networks through communication devices such as hubs, switches, routers, and firewalls, to list a few examples.

The growing problems associated with security exploits within the architecture of the Internet are of significant concern to network providers. Networks and network devices are increasingly affected by the damages caused by Denial of Service ("DoS") attacks. A DoS attack is defined as an action taken upon on a computer network or system by an offensive external device that prevents any part of the network from functioning in accordance with its intended purpose. This attack may cause a loss of service to the users of the network and its network devices. For example, the loss of network services may be achieved by flooding the system to prevent the normal servicing for performing legitimate requests. The flooding may consume all of the available bandwidth of the targeted network or it may exhaust the computational resources of the targeted system.

Distributed denial of service (DDoS) attacks are a subclass of denial of service (DoS) attacks. A DDoS attack involves multiple connected online devices, collectively known as a botnet, which are used to overwhelm a target website with fake traffic. DDoS attacks are launched with the goal of disturbing or taking down Internet based services, blocking legitimate users from accessing these services. In some cases, the attacks are relatively simple and easily blocked by well-prepared organizations but in many other cases, the attacks are complex multi-vector attacks where the attacker actively monitors the efficacy of the attack and launches new attack vectors in case the current attack vector(s) is/are being mitigated.

In order to measure the success of a DDoS attack, the attacker often uses various tools and techniques to monitor if the network services being attacked are still responding via a "DDoS probe". A DDoS probe is to be understood to be a network device that transmits a DDoS network probe packet request. Exemplary DDoS network probe packet requests include: Internet Control Message Protocol (ICMP) ping probes whereby responses are monitored to determine if there are any responses, or the response speed of a network device (e.g., a server) is degraded (e.g., higher or variable response rates indicate heavy load); simple Transfer Control Protocol (TCP) connection requests for determining if a TCP connection can be established to a network device; and service layer monitoring requests, whereby for web services, such requests typically consist of a constantly sending simple HTTP(S) GET request to determine if there is any response and/or measure the response speed from a network device (e.g., higher or variable response rates indicate heavy load indicative of a DDoS attack).

It is to be understood and appreciated such DDoS network probes are often started/implemented prior to launching a DDoS attack as the DDoS network probe is utilized by the attacker to determine the effectiveness of the DDoS attacker. Thus, after a DDoS attack is launched, the attacker typically monitors the DDoS probes to determine if the targeted network services are failing. If the targeted network services are indeed failing, the attacker will see this as an indication that the current launched attack vector(s) is/are successful. Knowing this is important to attackers as network attack infrastructure is often expensive, both to build up and/or lease from DDoS services (e.g., Booters/Stressers)—an attacker would prefer to use the least amount of resources needed to make a DDoS attack successful. Additionally, when attackers utilize more advanced layer 7 DDoS attacks, this will expose the source IPs of the devices launching the attack, risking that these devices will be blacklisted on the Internet and becoming unusable for further attacks.

Attackers are currently often utilizing automated attack infrastructures in response to DDoS mitigation tools becoming more automated. This will lead to an escalation in automation on both sides, making it more and more difficult to mitigate advanced/automated DDoS attacks.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

Generally, the illustrated embodiments relate to a system, apparatus and method for obscuring the status of a network service provided by a network device by providing fake (faux) responses to DDoS network probes (e.g., network devices that send DDoS network probe packet requests). The faux responses indicate that the targeted service is being degraded and/or is non-responsive while in actuality the targeted service is being protected from a network attack associated with the DDoS network probes (e.g., such as by one or more mitigation actions for thwarting a DDoS attack). Receipt of such faux responses by DDoS network probes effectively fools the attacker into believing that the attack is successful, thereby avoiding having the attacker escalating an attack such as by launching additional attack vectors and/or adding more resources to the ongoing attack for making the DDoS attack more successful. Additionally, if the attacker is using automated DDoS attack tools, these tools will be readily fooled into believing that the attack is successful, often resulting in the attacker ceasing the DDoS attack. To put otherwise, the aforesaid faux responses in effect act as a "smokescreen", hiding an internet service from outside monitoring by attackers (via DDoS network probes) while providing more time for network administrators, and allocation of resources to network attack mitigation devices, to mitigate the attack, without the attacker noticing. Also, when multiple "DDoS probes" are detected, this could be indicative of an early indicator of a DDoS attack, thereby notifying defenders to proactively enable DDoS mitigation services.

To achieve these and other advantages and in accordance with the purpose of the illustrated embodiments, in one aspect, described is a computer method and system for obscuring the status of a network service provided by a network device. Received in a network monitoring device is a network packet request message intended for a network device. The network monitoring device analyzes the received network packet request to determine whether the received network packet request is a DDoS network probe packet request. If the received packet request was determined to be a DDoS network probe packet request, a response is generated and sent from the network monitoring device to the device that sent the DDoS network probe packet request (e.g., the "DDoS probe") indicating a faux degradation of service level for the targeted/intended network device.

BRIEF DESCRIPTION OF THE DRAWINGS

So that those skilled in the art to which the subject disclosure appertains will readily understand how to make and use the devices and methods of the subject disclosure without undue experimentation, illustrated embodiments thereof will be described in detail herein below with reference to certain figures, wherein.

DETAILED DESCRIPTION OF CERTAIN EMBODIMENTS

Aspects of the disclosed embodiments are illustrated in the following description and related drawings directed to specific illustrated embodiments. Alternate embodiment's may be devised without departing from the scope of the illustrated embodiments. Additionally, well-known elements of the illustrated embodiments will not be described in detail or will be omitted so as not to obscure the relevant details of the illustrated embodiments.

The word "exemplary" is used herein to mean "serving as an example, instance, or illustration." Any embodiment described herein as "exemplary" is not necessarily to be construed as preferred or advantageous over other embodiments. Likewise, the term "illustrated embodiments" does not require that all illustrated embodiments include the discussed feature, advantage or mode of operation.

Unless defined otherwise, all technical and scientific terms used herein have the same meaning as commonly understood by one of ordinary skill in the art to which the illustrated embodiments belong. Although any methods and materials similar or equivalent to those described herein can also be used in the practice or testing of the illustrated embodiments, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. The terminology used herein is for the purpose of describing particular embodiments only and is not intended to be limiting of the illustrated embodiments. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence of actions described herein can be considered to be embodied entirely within any form of computer readable storage medium having stored therein a corresponding set of computer instructions that upon execution would cause an associated processor to perform the functionality described herein. Thus, the various aspects of the illustrated embodiment's may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the illustrated embodiments based on the below-described embodiments. Accordingly, the embodiments described herein are not to be limited by what has been particularly shown and described, except as indicated by the appended claims.

Figure 1:
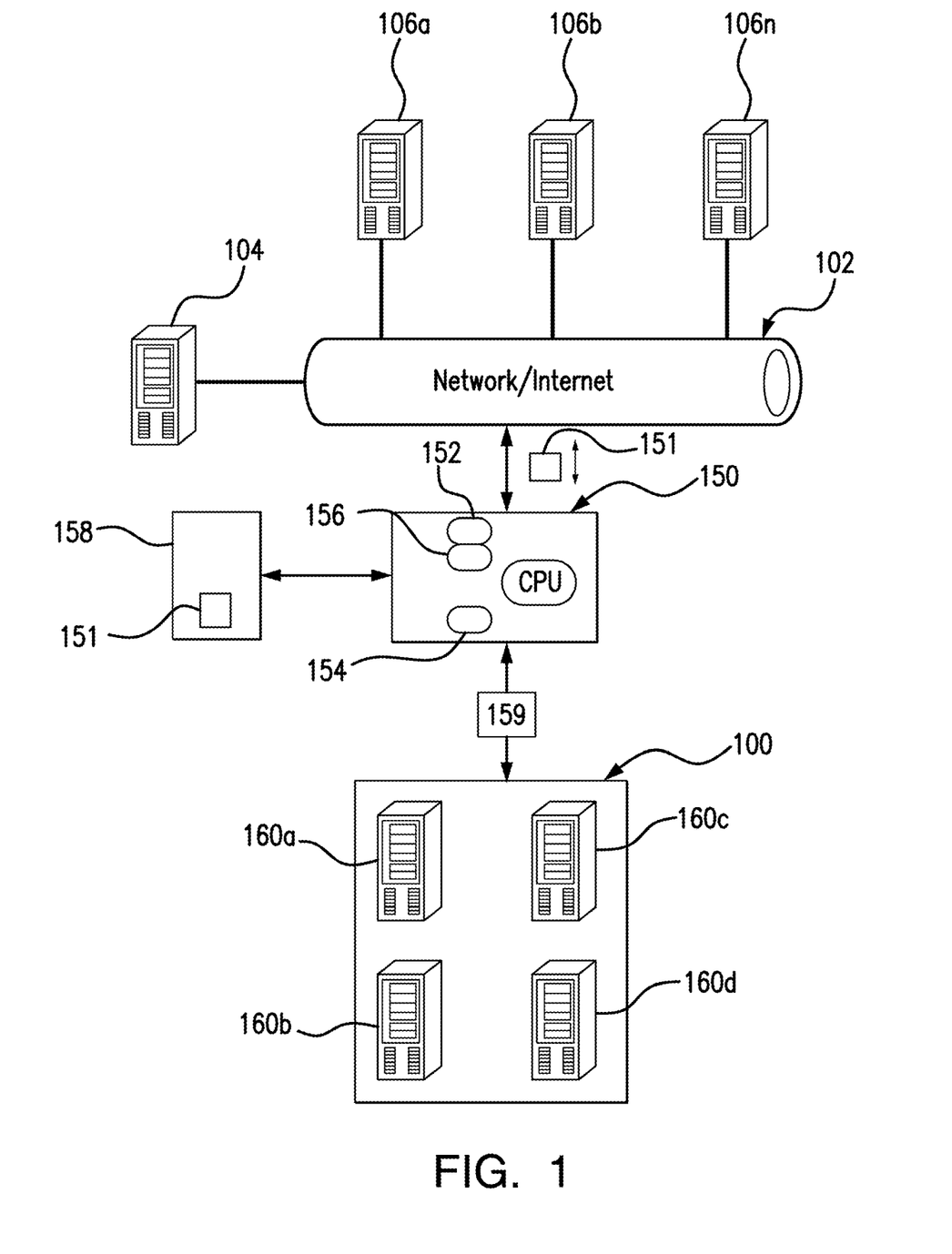
FIG. 1 is a schematic diagram showing network architecture and the relationship between a network and a network monitoring device according to an illustrated embodiment.

Turning now descriptively to the drawings, in which similar reference characters denote similar elements throughout the several views, FIG. 1 illustrates the relationship between a protected network 100, a network monitoring device 150, Internet 102, and external network devices 106a, 106b . . . 106n, 104.

In a typical implementation, the external network devices 106a, 106b . . . 106n, 104 attempt to connect to protected devices 160 within the protected network 100 typically via a private network or a public computer network such as the Internet 102. Examples of external devices include servers, laptops, desktop computers, tablet devices, mobile phones, mobile computing devices, and other similar devices and systems having Internet connectivity.

It is to be understood and appreciated the external devices 106a, 106b . . . 106n, 104 may be configured and operative to send a DDoS network packet request to a targeted device 160 providing the attacker associated with the external device 104, 106 with information to determine, via responses received from the targeted device/service 160, whether the network services being attacked are still responding and/or the effectiveness of the attack upon the targeted device/service 160 (e.g., the targeted device 160 is under heavy load and is slow in providing responsive messages). As mentioned above, exemplary DDoS network packet requests (and are not to be understood to be limited to): Internet Control Message Protocol (ICMP) ping probes whereby responses are monitored to determine if there are any responses, or the response speed of a network device 160 (e.g., a server) is degraded (e.g., higher or variable response rates indicate heavy load); simple Transfer Control Protocol (TCP) connection requests for determining if a TCP connection can be established to a network device 160; and service layer monitoring requests, whereby for web services, such requests typically consist of a constantly sending simple HTTP(S) GET request to determine if there is any response and/or measure the response speed from a network device 160 (e.g., higher or variable response rates indicate heavy load indicative of a DDoS attack). For ease of illustration and description, external devices 104, 106 determined to have sent DDoS network probe packet request in accordance the illustrated embodiments described herein, are hereinafter referred to as "DDoS network probes".

In a preferred embodiment, network traffic 151 from a communication network 102 to one or more monitored networks 100 is monitored by a network monitor device 150, such as the Arbor Edge Defense Perimeter Security & Defense system commercially available from NetScout™ Systems, Inc. The network monitor device 150 is preferably located between the Internet 102 and one or more monitored networks 100, preferably via a firewall 159. In other embodiments, the network monitor device 150 may be located within the Internet, service provider network or enterprise network rather than as a network edge as illustrated. In accordance with the illustrated embodiments, the network monitor 150 is preferably configured and operative to generate and transmit faux (fake) responses (i.e., as if they were sent from a targeted device/service 160) to DDoS network probe packet requests received from an external device 106a, 106b . . . 106n, 104 (a DDoS network probe) associated with a network attack sent to one or more devices/services 160 in a protected network 100. For instance, the faux responses may preferably indicate that the device/service 160 being attacked has been adversely effected by the attack (e.g., the targeted device 160 is under heavy load and is slow in providing responsive messages). The purpose of the faux responses is to fool the attacker (via the faux response messages provided to the DDoS network probe 104, 106) into believing that the attack is successful, thereby avoiding the attacker(s) from launching and/or escalating additional attack vectors and/or adding more resources in order to make the attack more successful.

It is to be understood and appreciated the network monitor device 150 is also preferably configured and operative to detect network attacks (e.g., DoS/DDoS), and to direct strategies for blocking such attacks using a variety of mitigation strategies. For instance, the network monitor device 150, in accordance with certain embodiments, is configured and operative for detecting and mitigating Distributed Denial of Service (DDoS) attacks in inbound packets 151 intended for a network device 160 in a protected network 100, while also being configured and operative for detecting and mitigating malicious data in outbound packets sent from a network device 160 (e.g., responsive to a malicious request from an external device (104, 106)).

The network monitor device 150 preferably includes a packet processing system preferably having an external high-speed network interface 152 and a protected high-speed network interface 154. Under current technology, these interfaces are capable of handling 1.0-100 Gbps, for example. The network monitor device 150 may further include processors 156 that preferably process the network packets 151 received at interfaces 152 and 154. Additionally, a central processing unit (CPU), random access memory (RAM), and a storage device 158 are preferably used to further support the processing of the received packets 151.

According to the exemplary configuration illustrated in FIG. 1, the network monitor device 150 may comprise a Client Edge (CE) device. The CE device can provide entry points into the monitored network 100. In alternative configuration, the network monitor device 150 may comprise a virtual device. In other words, at least some of the embodiments do not require the network monitor device 150 to be a physical hardware device or to be located in a particular part of the network infrastructure, as long as the network monitor device 150 can be in the path of the incoming traffic 151 to the monitored network 100. It is to be appreciated that for ease of illustration, the network monitor device 150 in the illustrated embodiment is shown coupled to a single monitored network 100. However, it is to be understood the illustrated embodiments are not to be limited to such a single monitored network 100 as the network monitor device 150 in accordance with the illustrated embodiments is to be understood to be coupled to a plurality of different monitored networks 100.

Figure 2:
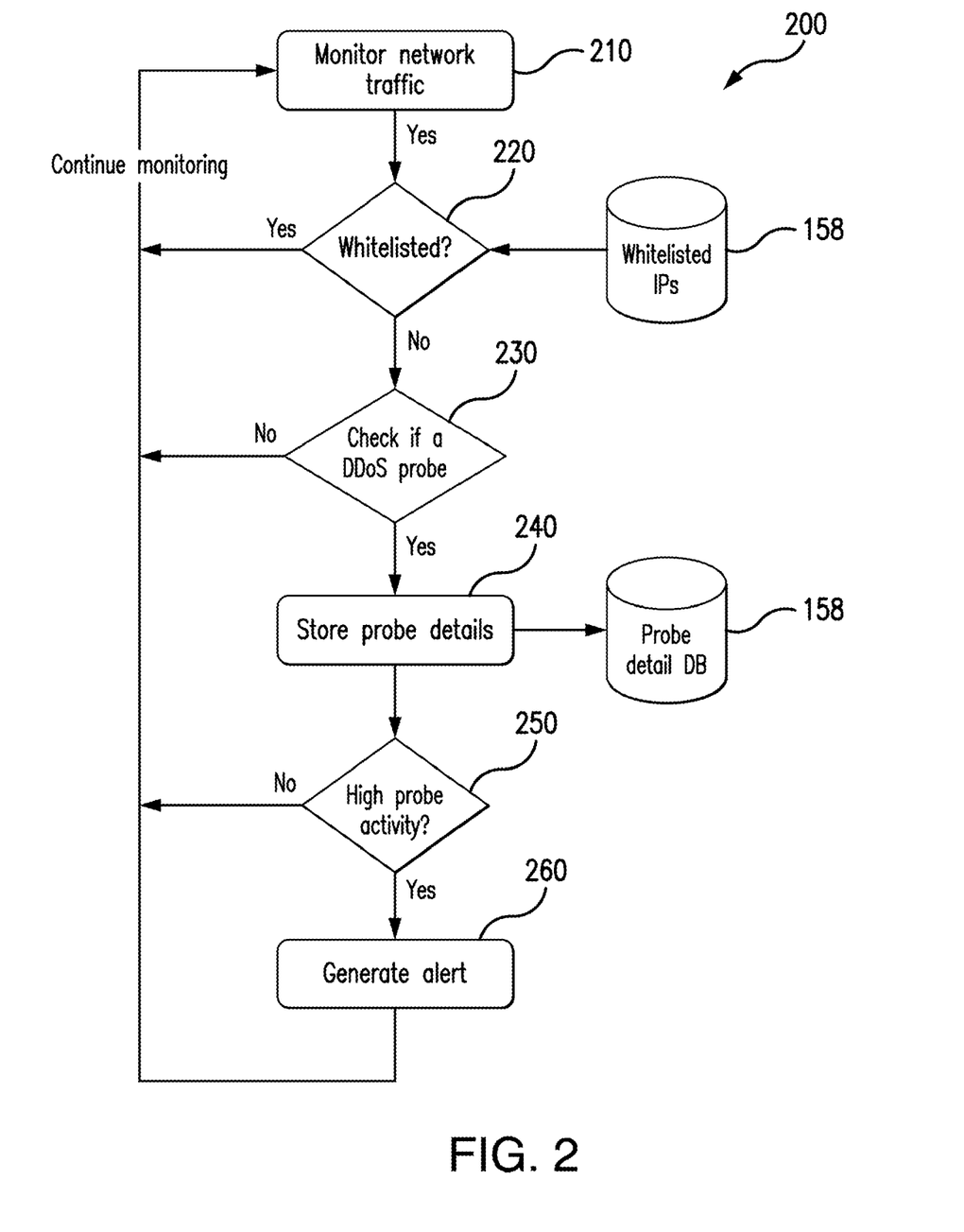
FIGS. 2 and 3 are flowcharts illustrating a process for obscuring the status of a network service provided by a network device in accordance with the illustrated embodiments.
Figure 3:
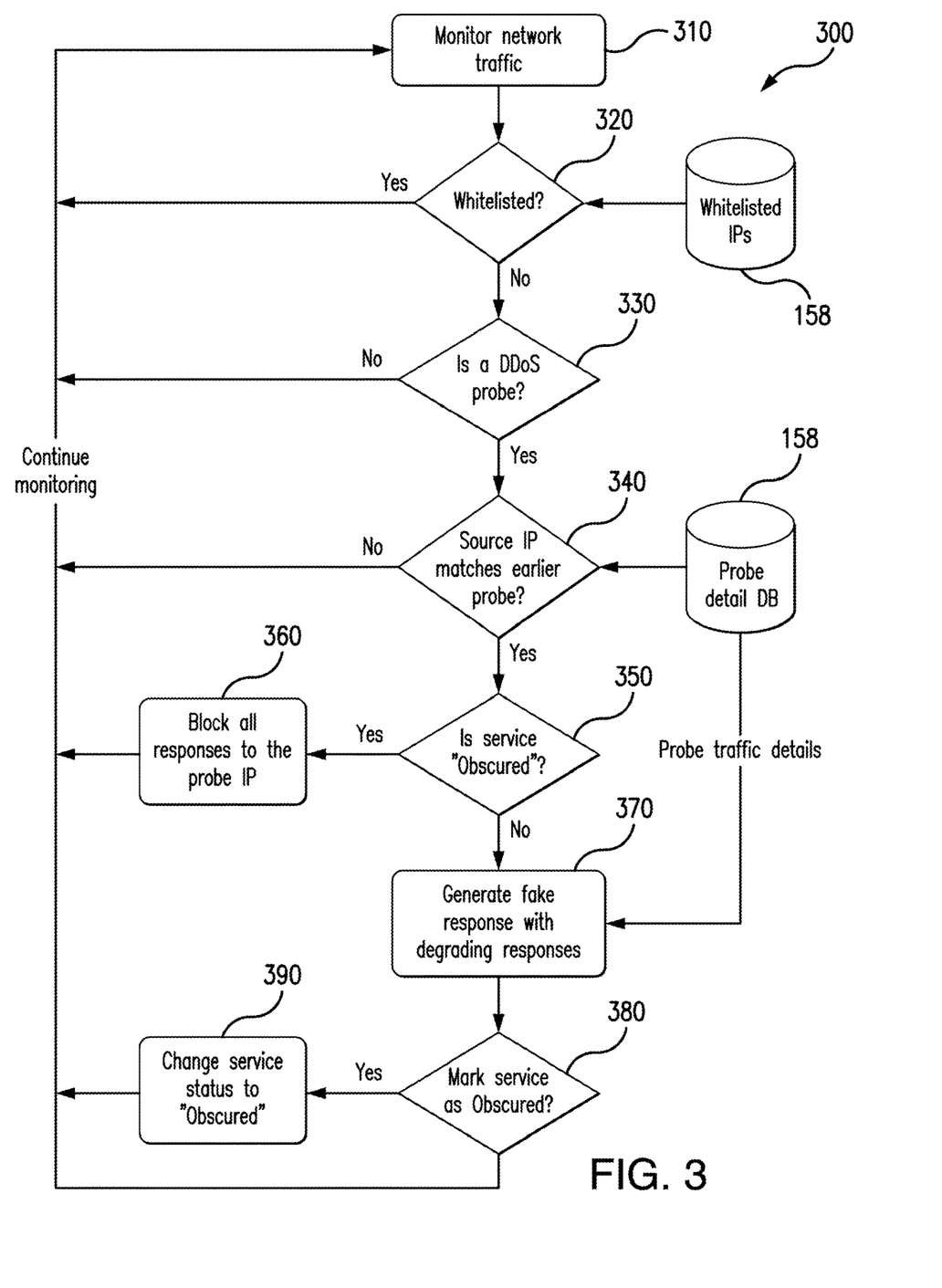

Turning now to FIGS. 2 and 3, illustrated are exemplary and non-limiting flowcharts depicting a method for obscuring the status of a network service provided by a network device 160 by generating and sending fake (faux) responses to DDoS network probes 104, 106 indicating that the targeted service provided by the targeted network device 160 is adversely effected by the attack (e.g., the targeted device 160 has been degraded and/or is non-responsive) while in actuality the targeted device 160 is being protected from the network attack. Before turning to description of FIGS. 2 and 3, it is noted that the flow diagrams in FIGS. 2 and 3 illustrate exemplary operational steps carried out in a particular order, as indicated by the lines connecting the blocks, but the various steps shown in this diagram can be performed in other orders, or in other combination or sub-combination. It should be appreciated that in some embodiments some of the steps described below may be combined into a single step. In some embodiments, one or more additional steps may be included.

Starting with FIG. 2, a process 200 for identifying and collecting information on detected DDoS probes 104, 106 will now be described. Starting at step 210, traffic packets 151 from a network 102 are intercepted/received by the monitoring device 150. Next in step 220, a determination, via analysis of the received packets 151, is then made by the monitoring device 150 as to whether the received packets 151 are associated with whitelisted IP addresses. It is to be appreciated that in accordance with the illustrated embodiments, a listing of such whitelisted IP addresses may preferably be stored (and updated) in a database 158 associated with the monitoring device 150. In the present context, whitelisted IP addresses are typically a list of network devices (104, 106) considered by a particular authority or group to be acceptable and that should be trusted.

Returning to step 350, if yes, no further processing on the received packets 151 is required by the monitoring device 150. And if no (the received packets 151 do not have a whitelisted IP address), then at step 230, inbound connection requests contained in the received packet requests 151 are further analyzed by monitoring device 150 to determine if they can be classified as being a DDoS network probe packet request (thus sent from a DDoS probes (104, 106)). For instance, this may be performed by utilizing data collected over a certain period time associated with common packet requests 151 for detecting patterns/behavior associated with a DDoS network probe packet request. If no, then no further processing on the received packet request 151 is required by the monitoring device 150.

But if yes (the received packet requests 151 are determined to be sent from a DDoS probe 104, 106), then at step 240, certain details about said detected DDoS probes 104, 106 are preferably stored in a historical database (e.g., 158) which preferably includes certain characteristics of the detected DDoS probe 104, 106, such as (but not limited to): protocol, source IP, probe payload (ICMP code, ICMP type, ICMP payload/TCP flags and fields/HTTP(S) URI's and headers). Next at step 250, a determination is made by network monitoring device 150 whether there is a sudden increase in DDoS network probe packet requests relating to a targeted device/service 160, which is a likely indication that attack will be launched shortly on the targeted device/service 160. If yes, a message is generated in step 260 indicative of such an anticipated and/or launched attack providing a network administrative notice to implement precautionary steps to mitigate such an attack and/or enable a network attack mitigation device (e.g., monitor device 150) to implement mitigation techniques for casing mitigation of such a DDoS attack on the targeted device/service 160. Exemplary mitigation techniques may include (and is not to be understood to me limited to): traffic marking; traffic-rating, traffic-redirecting, traffic-marking, traffic-accepting, traffic-dropping, traffic rate-limiting.

With the process 200 for identifying and collecting information on detected DDoS network probe packet requests/DDoS probes 104, 106 being described above, the process 300 for obscuring the status of a network service provided by a network device 160 by generating and sending fake (faux) responses to DDoS network probes 104, 106 is now described. It is to be appreciated, processes 200 and 300 may be simultaneously performed (e.g., via a network monitoring device 150).

Starting at step 310, traffic packet requests 151 from a network 102 are intercepted/received by the monitoring device 150. Next in step 320, a determination is then made by the monitoring device 150 as to whether the received packet requests 151 are associated with whitelisted IP addresses (which may be stored/updated in a database 158 associated with the monitoring device 150). If yes, no further processing on the received packets 151 is required by the monitoring device 150.

If no (the received packets 151 do not have a whitelisted IP address), then at step 330, inbound connection requests contained in the received packet requests 151 are further analyzed by monitoring device 150 to determine if they can be classified as being a DDoS network probe packet request (thus sent from a DDoS probes (104, 106)) (as described above with reference to process 200). If no (the requests are not originating from a DDoS network probe), then no further analysis on the received packet request 151 is required by the monitoring device 150. If yes (the requests are originating from a DDoS network probe 104, 106), then at step 340 a determination is made as to whether the detected DDoS network probe 104, 106 was previously detected (e.g., in step 230). This determination is preferably accomplished by monitoring device 150 by utilizing information previously collected on the detected DDoS network probe (e.g., in step 230) and preferably stored in database 158. If no (the DDoS probe was not previously detected) then no further action by monitoring device 150 is taken other than continuing monitoring of the received packet requests 151 for the DDoS network probe(s). This is because there will typically be insufficient information gathered on the detected DDoS probe at this time for initiating the one or more actions described below.

If yes (the DDoS probe was determined in step 340 to be previously detected) then the process 300 proceeds to step 350 to preferably determine whether the targeted device/service 160 being attacked related to the detected DDoS probe 104, 106 has been obscured (e.g., has it been negatively impeded by a threshold value—for instance, has the targeted service degraded below one or more prescribed threshold parameter values (e.g., response times)). If yes, then at step 360 responses from the targeted device/service 160 are block to all requests from the DDoS probe 104, 106 so as to provide indication to the attacker associated with the DDoS probe 104, 106 that the attack was successful (e.g., the targeted device 160 is no longer functional to provide response messages) with the expectation that the attacker will no longer escalate attack vectors upon the targeted device/service 106 thus providing ample time for mitigation actions on the targeted device/service 160 to be implemented and become effective for mitigating the attack. It is to be appreciated that in accordance with the illustrated embodiments, when a service has been marked as "Obscured", preferably service probes towards the services under attack, will also be blocked/degraded in anticipation of the scenario that the attacker suddenly switches to other type of DDoS probes, simulating that the service is down on Layer 2 (L2)/Layer 3 (L3) and Layer 7 (L7).

Returning to step 350, if no (the targeted device/service 160 was determined not to yet be obscured by the attack associated with the detected DDoS network probe 104, 106), then at step 360 a response message is generated and transmitted from the monitoring device 150 indicating a faux degradation of service level from the targeted network device/service 160 so as to preferably indicate to the DDoS network probe 104, 106 slow responses or degraded services levels. In accordance with the illustrated embodiments, these responses are preferably generated to simulate a service from a targeted device 160 with gradually degraded service levels so as provide indication to the DDoS attack probe 104, 106 as total service degradation. Receipt of such faux responses sent from monitoring device 150 by a DDoS network probe 104, 106 will effectively fool the attacker into believing that the attack is successful, thereby avoiding having the attacker escalating an attack such has by launching additional attack vectors and/or adding more resources to the ongoing attack for making the DDoS attack more successful. Additionally, if the attacker is using automated DDoS attack tools, these tools will be readily fooled into believing that the attack is successful, often resulting in the attacker ceasing the DDoS attack. To put otherwise, the aforesaid faux responses in effect act as a "smokescreen", masking an Internet service from monitoring by DDoS network probes 104, 106, while also providing more time for network administrators, and allocation of resources to network attack mitigation devices, to mitigate the attack, without the attacker noticing.

In accordance with certain illustrated embodiments, after transmission of such a faux message (step 370), then next in step 380, the monitoring device 150 yet again preferably determines whether the targeted device/service 160 being attacked related to the detected DDoS probe 104, 106 has been obscured since further time has elapsed from the first determination of whether the targeted device/service has been obscured (step 350). If yes, then at step 390 the targeted device/service 160 is to be labelled as being obscured so to automatically block all future responses from the targeted device/service 160 to future requests from the DDoS probe 104, 106, for at least the reasoning set forth above in step 350. It is to be appreciated that when the attack stops, and a certain time period has passed, request messages from DDoS probes are allowed as normal again.

In accordance with certain other illustrated embodiments, it is to be appreciated that when encrypted network probes 104, 106 are deployed which cannot be decoded, the received packet requests are preferably sent onwards to the web service 160, but the response from the targeted web service 160 is delayed by the monitoring device 150 by introducing artificial delays when sending out the response packets. Further, regarding probe packets originating from own service probes (internal/external), these will be whitelisted. Additionally, probes from publicly accessible external services (e.g., such as "DownDetector") will allowed as well. Further, in accordance with certain illustrated embodiments, the monitoring device 150 is configured and operational to perform one or more mitigation actions for the intended network device 160 while simultaneously transmitting the response from the network monitoring device 150 to a DDoS network probe indicating a faux degradation of service level associated with the intended device 160.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of the present disclosure, and not in limitation thereof.

It is to be understood the various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The flowchart and block diagrams in the Figures illustrate the architecture, functionality, and operation of possible implementations of systems, methods and computer program products according to various embodiments of the present illustrated embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various illustrated embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for obscuring the status of a network service provided by a network device, comprising:
    receiving, in a network monitoring device, a network packet request intended for a network device;
    determining, in the network monitoring device, whether the received network packet request is sent from a device sending distributed denial of service (DDoS) network probe packet requests (a DDOS probe); and
    transmitting, if the received packet request was determined to be sent from a DDOS probe, a response from the network monitoring device to the DDOS probe indicating a faux degradation of service level for the intended network device, wherein the faux degradation of service level is simulated to progressively worsen over time to indicate a total service degradation, while simultaneously performing at least one mitigation action for the intended network device to protect against a DDOS attack associated with the DDOS probe.

2. The computer implemented method as recited in claim 1, further including analyzing, in the network monitoring device, the received network packet request to determine whether it originates from a trusted IP source, wherein the determination of whether the received packet request is sent from a DDOS probe is caused when the received packet request was not determined to originate from a trusted IP source.

3. The computer implemented method as recited in claim 1, further including determining in the network monitoring device, if the received packet request was determined to be sent from a DDOS probe, whether the DDOS probe was previously detected wherein the response transmitted to the DDOS probe indicating the faux degradation of service is transmitted if the DDOS probe was determined to be previously detected.

4. The computer implemented method as recited in claim 3, wherein information previously collected on the previously detected DDOS probe is utilized for transmitting the response to the DDOS probe indicating the faux degradation of service.

5. The computer implemented method as recited in claim 3, further including:
    determining in the network monitoring device, if the received packet request was determined to be transmitted from a DDOS probe, whether a service level provided by the intended network device has degraded below one or more prescribed threshold parameter values; and blocking, if the service level is determined to have degraded below the one or more prescribed thresholds, responses to the DDOS probe from the intended network device, wherein responses indicating the faux degradation of service are only sent if the determined service level provided by the intended network device exceeds the one or more prescribed thresholds service level values.

6. The computer implemented method as recited in claim 1, further including:

determining in the network monitoring device, if the received packet request was determined to be transmitted from a DDOS probe, whether a service level provided by the intended network device has degraded below one or more prescribed threshold parameter values; and blocking, if the service level is determined to have degraded below the one or more prescribed thresholds, all responses to the DDOS probe from the intended network device, wherein responses indicating the faux degradation of service level are only sent if the determined service level provided by the intended network device exceeds the one or more prescribed thresholds service level values.

7. The computer implemented method as recited in claim 1, further including:

determining in the network monitoring device, after transmitting the response from the network monitoring device to the DDOS probe indicating the faux degradation of service, whether a service level provided by the intended network device has degraded below one or more prescribed threshold parameter values; and blocking, if the service level is determined to have degraded below the one or more prescribed thresholds, responses to the DDOS probe from the intended network device.

8. The computer implemented method as recited in claim 1, wherein determining whether the received packet was transmitted from a DDOS probe includes analyzing network packet requests collected over a period of time associated with a common IP source to detect one or more patterns indicative of DDOS probe packet requests.

9. The computer implemented method as recited in claim 1, wherein a determined DDOS probe packet request consists of one or more: Internet Control Message Protocol (ICMP) ping probes; a Transmission Control Protocol (TCP) connection requests; and a service level monitoring request.

10. The computer implemented method as recited in claim 1, further including performing by the network monitoring device, one or more mitigation actions for the intended network device simultaneously with transmitting the response from the network monitoring device to the DDOS probe packet requests indicating the faux degradation of service.

11. A computer implemented method for obscuring the status of a network service provided by a network device, comprising:

receiving, in a network monitoring device, a network packet request intended for a network device;

determining, in the network monitoring device, whether the received network packet request was transmitted from a device sending distributed denial of service (DDoS) network probe packet requests (a DDOS probe);

determining in the network monitoring device, if the received packet request was determined to be transmitted from a DDOS probe, whether the DDOS probe was previously detected; and transmitting, if the received packet request was determined to be transmitted from a previously detected DDOS probe, a response from the network monitoring device to the DDOS probe indicating a faux degradation of service level associated with the intended network device, wherein the faux degradation of service level is simulated to progressively worsen over time to indicate a total service degradation, while simultaneously performing at least one mitigation action for the intended network device to protect against a DDOS attack associated with the DDOS probe.

12. The computer implemented method as recited in claim 1, further including:

determining in the network monitoring device, if the received packet request was determined to be transmitted from a DDOS probe, whether a service level provided by the intended network device has degraded below one or more prescribed threshold parameter values; and blocking, if the service level is determined to have degraded below the one or more prescribed thresholds, responses to the DDOS probe from the intended network device, wherein responses indicating the faux degradation of service are only sent to the DDOS probe from the network monitoring device if the determined service level provided by the intended network device exceeds the one or more prescribed thresholds service level values.

13. The computer implemented method as recited in claim 12, further including:

determining in the network monitoring device, after transmitting the response from the network monitoring device to the DDOS probe indicating the faux degradation of service, whether a service level provided by the intended network device has degraded below one or more prescribed threshold parameter values; and blocking, if the service level is determined to have degraded below the one or more prescribed thresholds, responses to the DDOS probe from the intended network device.

14. The computer implemented method as recited in claim 12, further including performing by the network monitoring device, one or more mitigation actions for the intended network device simultaneously with transmitting the response from the network monitoring device to the DDOS probe indicating the faux degradation of service.

15. The computer implemented method as recited in claim 12, further including analyzing, in the network monitoring device, the received network packet request to determine whether it originates from a trusted IP source, wherein the determination of whether the received packet request is transmitted from a DDOS probe is caused when the received packet request was not determined to originate from a trusted IP source.

16. The computer implemented method as recited in claim 12, wherein determining whether the received packet was transmitted from a DDOS probe includes analyzing network packet requests collected over a period of time associated with a common IP source to detect one or more patterns indicative of a DDOS network probe packet request.

17. The computer implemented method as recited in claim 16, wherein a determined DDOS network probe packet request consists of one or more: Internet Control Message Protocol (ICMP) ping probes; a Transmission Control Protocol (TCP) connection requests; and a service level monitoring request.

\* \* \* \* \*